United States Patent [19]
Kato et al.

[11] Patent Number: 4,969,723
[45] Date of Patent: Nov. 13, 1990

[54] PARALLAX ADJUSTING MECHANISM FOR A FINDER DEVICE

[75] Inventors: Masatake Kato, Tokyo; Makoto Sekita, Kanagawa; Kenichi Kawamoto, Tokyo, all of Japan

[73] Assignee: Canon Kabushiki Kaisha, Tokyo, Japan

[21] Appl. No.: 281,787

[22] Filed: Dec. 9, 1988

[30] Foreign Application Priority Data

Dec. 22, 1987 [JP] Japan ................................ 62-326098

[51] Int. Cl.$^5$ ...................... G03B 13/14; G03B 13/06; G02B 23/14; G02B 7/02
[52] U.S. Cl. ..................................... 350/501; 350/569; 350/567; 350/570; 350/247; 350/252; 354/221; 354/225; 358/224
[58] Field of Search ............... 350/501, 569, 567, 560, 350/570, 453, 247, 252; 354/221, 222, 224, 225; 358/224

[56] References Cited

U.S. PATENT DOCUMENTS

| | | | |
|---|---|---|---|
| 1,358,721 | 11/1920 | Fujii | 350/252 |
| 3,011,403 | 12/1961 | Dlutzik | 350/560 |
| 3,222,987 | 12/1965 | Wrigglesworth | 350/252 |
| 3,719,132 | 3/1973 | Urano | 350/252 |
| 3,774,994 | 11/1973 | Urano | 350/252 |
| 4,526,444 | 7/1985 | Fantone et al. | 350/501 |
| 4,763,998 | 8/1988 | Tsuji et al. | 350/427 |

FOREIGN PATENT DOCUMENTS 47506 4/1911 Austria ............................ 350/252
4719028 11/1970 Japan .

*Primary Examiner*—Jon W. Henry
*Attorney, Agent, or Firm*—Fitzpatrick, Cella, Harper & Scinto

[57] ABSTRACT

In an external-measured real image type finder optical system having a prism for a non-reverse erecting image interposed in between an objective lens system and an eyepiece lens system, parallax correction is accomplished by adjusting the position of at least a part of the objective lens system within a plane perpendicular to the optical axis of the finder optical system.

1 Claim, 2 Drawing Sheets

PARALLAX ADJUSTING MECHANISM FOR A FINDER DEVICE

BACKGROUND OF THE INVENTION

1. Field of the Invention

This invention relates to an external-measured real image type finder optical system provided with an objective lens for its own use, and more particularly to a viewfinder optical system which is arranged to permit correction of the parallax of the finder field.

2. Description of the Related Art

A real image type finder optical system arranged to permit an inverted finder image to be sighted as a non-reverse erect image by means of a Porro prism, or the like, has been known. An example of the viewfinder of this kind has been disclosed in Japanese Utility Model Publication No. SHO 47-19028, etc.

Compared with a reverse Galilean finder, or the like, arranged to give a virtual image of an object to be photographed, a real image type finder optical system generally permits sighting a clearer, brighter field image and a clearer field frame. Besides, the latter permits the optical system to be more compactly arranged. Hence, the real image type finder optical system is often used for a compact camera.

FIG. 1 of the accompanying drawings shows in a side view a typical real image type finder optical system. In FIG. 1, reference numerals 100, 101, 102 and 103 respectively denote an objective lens, a Porro prism, an eyepiece lens and a field frame positioned at an image plane.

During recent years, an electronic camera of the kind having a solid-state image sensor such as a CCD has become practicable. The image sensing plane of the solid-state image sensor of the camera of this kind is of the so-called ½ inch size measuring 6.4 mm by 4.8 mm. Compared with the ordinary 35 mm film size, the size of the image sensing plane is about 1/5 of the former in length. Even with an allowable degree of parallax assumed to be about 5%, the camera of this kind, therefore, must be arranged to have a deviating degree of field less than 0.24 mm in the shorter side direction of the image sensing plane. The parallax correction would be very difficult if the camera of this kind is arranged to have the same degree of precision for parts and assembly as the ordinary 35 mm size camera. Particularly, for the above stated real image type finder optical system which permits clear sighting of the field and the field frame, this problem is serious. This problem, therefore, necessitates a severe allowable degree of parallax.

SUMMARY OF THE INVENTION

It is an object of this invention to provide a parallax correction mechanism which is capable of keeping an adequate degree of precision to solve the above stated problem of the prior art by performing adjustment in a simple manner.

To attain this object, an external-measured real image type finder optical system having a prism for a non-reverse erect image interposed in between an objective lens system and an eyepiece lens system is arranged according to this invention to correct parallax by adjusting the position of at least a part of the objective lens system within a plane perpendicular to the optical axis of the finder optical system.

The above object and features of the invention will become more apparent from the following detailed description of an embodiment thereof taken in connection with the accompanying drawings.

DETAILED DESCRIPTION OF THE PREFERRED EMBODIMENTS

Figure 2:
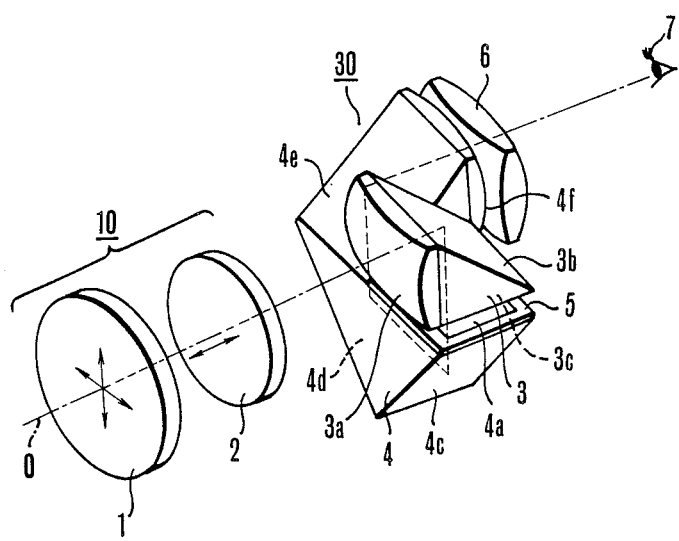
FIG. 2 is an oblique view showing a finder optical system arranged according to this invention as an embodiment thereof.

FIG. 2 shows a finder optical system arranged, according to this invention, separately from a photo-taking lens which is not shown. Referring to FIG. 2, an objective lens 10 is arranged to have a positive refractive power as a whole. The objective lens 10 includes a first lens unit 1 which is arranged to have a negative refractive power and to be immovable in the direction of the finder optical axis O, and a second lens unit 2 which is arranged to have a positive refractive power and to be movable in the direction of the finder optical axis during a change of magnifying power. In changing the magnifying power of the optical system, the image plane moves to bring about a little change in diopter. However, in the case of this embodiment, the optical system is set to have the dioptric power vary within a given allowable range. A Porro prism 30 includes a first prism 3 and a second prism 4. A field frame 5 is interposed in between the first prism 3 and the second prism 4. An eyepiece lens 6 is arranged to have a positive refractive power. A reference numeral 7 denotes a sighting pupil. A light flux from an object to be photographed passes through the objective lens 10 to be incident upon an entrance face 3a of the first prism 3. The incident light flux is then rectangularly polarized by a first reflection face 3b to form an object's image in the vicinity of the field frame 5 which is disposed between an exit face 3c of the first prism 3 and an entrance face 4a of the second prism 4. After this, the object's image forming light flux is twice polarized by reflection faces 4c and 4d which have their normals orthogonally intersect each other. The light flux then exits from an exit face 4f approximately in parallel to the optical axis of the objective lens 10 through a reflection face 4e which follows the reflection faces 4c and 4d. The light flux from the exit face 4f reaches the sighting pupil 7 through the eyepiece lens 6.

In the case of this embodiment, the parallax is corrected by adjusting the position of the first lens unit 1 within a plane which is nearly perpendicular to the optical axis of the finder optical system. The reason for this is as follows: The focal length of the whole objective lens 10 is relatively short. Therefore, at least a part of the objective lens 10 is decentered in parallel instead of tilting the whole finder optical system. This is advantageous not only for a reduction in size but also effective for parallax correction. In cases where the objective lens 10 possesses no power varying function, it would be more advantageous to arrange the whole objective lens 10 to be adjusted in terms of simplification of the structural arrangement. However, in the case of this embodiment, the objective lens 10 has a power varying function for change-over between two focal lengths. In this case, it permits more simplification of the structural arrangement to adjust the position of the first lens unit 1 which is arranged to be immovable in varying the power. With the embodiment having the power variable objective lens 10, in varying the power, the second lens unit 2 moves along the optical axis while the first lens unit 1 remains stationary. The second lens unit 2 is located closer to the sighting pupil 7 when a shorter focal length is selected, and closer to the object in the case of a longer focal length.

In correcting for parallax by shifting the position of either the first lens unit 1 or the second lens unit 2, the parallax can be more effectively corrected in general by shifting the second lens unit 2. However, since the second lens unit 2 shifts its position along the optical axis in varying the power, the provision of a position adjusting mechanism within a plane perpendicular to the finder optical axis necessitates a considerably complex structural arrangement. In view of this, it is preferable for parallax correction to adjust the position of the first lens unit 1 which remains stationary in varying the power.

Meanwhile, the eyepiece lens 6 and the Porro prism 30 which includes the field frame 5 are fixed to the camera body which is not shown. This precludes such problems as turning of the finder field, an asymmetric distortion of upper, lower, left and right frame parts resulting from the distortion of the eyepiece lens 6, etc.

Figure 1:
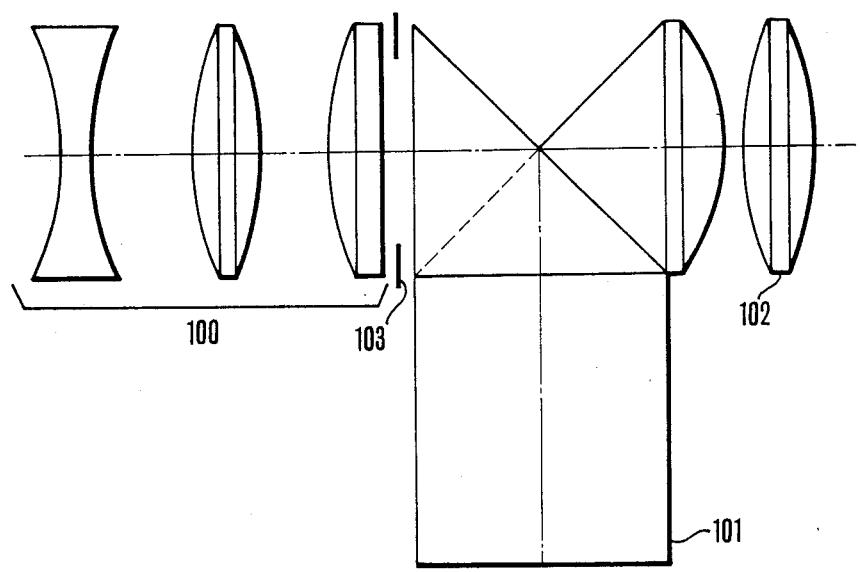
FIG. 1 is a side view showing a typical example of the conventional real image type finder optical system.
Figure 3:
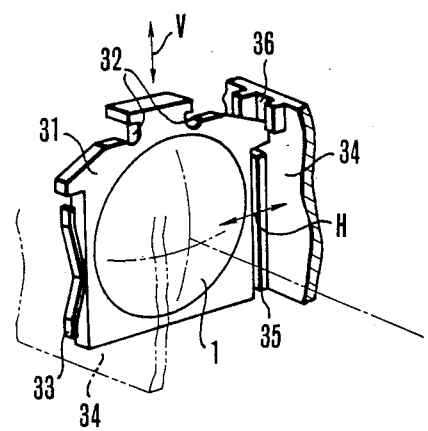
FIG. 3 is an oblique view showing an adjusting mechanism arranged according to this invention.

FIG. 3 shows an adjusting mechanism which is arranged according to this invention. Referring to FIG. 3, a holding frame 31 is arranged to carry the first lens unit 1 of the objective lens 10 which remains stationary during a power varying process. The holding frame 31 is provided with a notch part 32 which is formed in the upper part of the holding frame 31. The notch part 32 is arranged to engage a protruding part (not shown) for vertical position adjustment, i.e., adjustment in the direction of arrow V, within a plane perpendicular to the optical axis. On one side of the holding frame 31 is provided a leaf spring 33. The leaf spring 33 is arranged to urge and push the holding frame 31 in one direction and is inserted in between the holding frame 31 and a finder lens barrel 34. On the opposite side of the holding frame 31 is inserted a washer plate 35. The washer plate 35 is provided for defining the position of the holding frame 31 in the horizontal direction as indicated by an arrow H. Further, the finder lens barrel 34 is provided with a groove 36 which is formed to guide the holding frame 31.

In assembling the embodiment which is arranged as described in the foregoing, parallax adjustment in relation to an image sensing system is accomplished as follows: The horizontal position (in the direction of arrow H) of the first lens unit 1 is first adjusted by inserting, in between the holding frame 31 and the finder lens barrel 34, the washer plate 35 which is selected from several plates of different thickness values. Next, the holding frame 31 is vertically moved (in the direction of arrow V) for parallax correction by holding the notch part 32 with an adjusting tool such as a tweezer which is not shown. In this instance, the parallax adjustment can be accomplished without difficulty by virtue of the leaf spring 33. After completion of adjustment, the holding frame 31 is fixed in position by securing it to the finder lens barrel 34.

Further, as regards parallax correction in the vertical direction, a parallax correcting function may be discretely arranged, in addition to the arrangement of this embodiment, to correct a parallax resulting from a change in an object distance in association with the movement of a focusing lens of the photo-taking lens during a photographing operation.

In another conceivable method for adjustment, the parallax correction may be accomplished by adjusting the position of the field frame 5. In accordance with that method, however, the size of the Porro prism 30 increases in order to secure an effective part of the Porro prism 30. Then, the magnification of the viewfinder would disadvantageously decrease.

In accordance with this invention, as described in the foregoing, a finder optical system can be arranged to have its parallax adequately corrected in a simple manner even in the case of a camera which is provided with a real image type external measuring finder and has a relatively small image plane size.

What is claimed is:
1. A camera including a real image type finder device, said finder comprising:
   an objective lens having a positive refractive power;
   an eyepiece lens for sighting an image formed by said objective lens;
   a lens barrel;
   a holding frame for holding at least one lens constituting said objective lens;
   a spring located between said lens barrel and said holding frame for exerting a force against said holding frame in a first direction vertical to an optical axis of said objective lens;
   a member of preselected size being located between said lens barrel and said holding frame in opposition to the force of said spring to set a position of said lens relative to the first direction; and
   a guide member provided on said lens barrel and extending in a second direction which is vertical to the optical axis of said objective lens and vertical to said first direction to guide said holding frame in said second direction, whereby said holding frame is adjustable to position said objective lens to correct for parallax in a field of said finder device.

* * * * *

UNITED STATES PATENT AND TRADEMARK OFFICE
CERTIFICATE OF CORRECTION

PATENT NO. : 4,969,723

DATED : November 13, 1990

INVENTOR(S) : Masatake Kato, et al.

It is certified that error appears in the above-identified patent and that said Letters Patent is hereby corrected as shown below:

On the title page:

[56] References Cited:

Under "FOREIGN PATENT DOCUMENTS",
"4719028  11/1970  Japan." should read
--47-19028  11/1972  Japan--.

COLUMN 4:

Line 32, "said finder" should read --said finder device--.

Signed and Sealed this

Fifth Day of January, 1993

Attest:

DOUGLAS B. COMER

Attesting Officer     Acting Commissioner of Patents and Trademarks